(12) United States Patent
Maliniak et al.

(10) Patent No.: US 9,540,939 B2
(45) Date of Patent: Jan. 10, 2017

(54) GAS TURBINE ENGINE WITH ATTACHED NOSECONE (71) Applicant: United Technologies Corporation, Hartford, CT (US)

(72) Inventors: David Maliniak, Middletown, CT (US); Daniel J. Monahan, Middletown, CT (US); Jonathan D. Little, West Hartford, CT (US); Veerachari J. Mayachari, East Hartford, CT (US); Rakesh Sharma N. Dumavath, East Hartford, CT (US); Arun Kumar Jayasingh, East Hartford, CT (US); Herbert L. Walker, Bloomfield, CT (US)

(73) Assignee: United Technologies Corporation, Farmington, CT (US)

(*) Notice: Subject to any disclaimer, the term of this patent is extended or adjusted under 35 U.S.C. 154(b) by 525 days.

(21) Appl. No.: 14/141,055

(22) Filed: Dec. 26, 2013

(65) Prior Publication Data

US 2015/0003968 A1    Jan. 1, 2015

Related U.S. Application Data

(60) Provisional application No. 61/746,784, filed on Dec. 28, 2012.

(51) Int. Cl.
*F02C 7/04* (2006.01)
*F01D 9/04* (2006.01)
*F01D 25/24* (2006.01)

(52) U.S. Cl.
CPC .............. *F01D 9/041* (2013.01); *F01D 25/243* (2013.01); *F02C 7/04* (2013.01); *F05D 2230/60* (2013.01); *F05D 2230/70* (2013.01); *Y02T 50/671* (2013.01); *Y02T 50/673* (2013.01); *Y10T 29/49321* (2015.01)

(58) Field of Classification Search
CPC ........... F02C 7/04; F02C 7/00; F05D 2230/70; F05D 2230/60; Y02T 50/671; Y10T 29/49229; B64C 11/14; F01D 5/066
See application file for complete search history.

(56) References Cited

U.S. PATENT DOCUMENTS

| | | | |
|---|---|---|---|
| 3,219,263 A | 11/1965 | Davies et al. | |
| 3,799,693 A * | 3/1974 | Hull | F02C 7/04 244/53 B |
| 4,060,980 A | 12/1977 | Elsaesser et al. | |
| 4,393,650 A * | 7/1983 | Pool | F02C 7/047 416/132 R |
| 5,281,087 A | 1/1994 | Hines | |
| 5,573,378 A | 11/1996 | Barcza | |
| 6,447,255 B1 | 9/2002 | Bagnall et al. | |
| 6,561,763 B2 * | 5/2003 | Breakwell | F02C 7/04 416/245 R |
| 7,878,762 B2 | 2/2011 | Suciu et al. | |

(Continued)

*Primary Examiner* — Igor Kershteyn
*Assistant Examiner* — Eldon Brockman
(74) *Attorney, Agent, or Firm* — Kinney & Lange, P.A.

(57) ABSTRACT

A gas turbine engine includes a compressor section and a nosecone assembly. The compressor section includes an inlet guide vane assembly including an inner shroud, an outer shroud, and an inlet guide vane extending from the inner shroud to the outer shroud. The nosecone assembly is attached to the inner shroud.

20 Claims, 9 Drawing Sheets

(56) References Cited

U.S. PATENT DOCUMENTS

| | | | |
|---|---|---|---|
| 7,882,694 B2 | 2/2011 | Suciu et al. | |
| 7,887,296 B2 | 2/2011 | Suciu et al. | |
| 8,152,469 B2 | 4/2012 | Suciu et al. | |
| 8,292,592 B2 | 10/2012 | Welch et al. | |
| 8,322,991 B2* | 12/2012 | MacFarlane | F01D 5/027 416/144 |
| 8,678,772 B2* | 3/2014 | Dieling | F02C 7/04 416/245 R |
| 2002/0102160 A1* | 8/2002 | Breakwell | F02C 7/04 415/219.1 |
| 2009/0214354 A1* | 8/2009 | Bagnall | F01D 5/066 416/245 R |
| 2010/0047077 A1* | 2/2010 | Daniels | B64F 1/005 416/244 A |
| 2010/0051112 A1* | 3/2010 | Dieling | F02C 7/04 137/15.1 |
| 2010/0215507 A1 | 8/2010 | Breakwell | |
| 2010/0260605 A1* | 10/2010 | MacFarlane | F01D 5/027 416/144 |
| 2010/0326041 A1 | 12/2010 | Edmondson | |
| 2011/0236217 A1 | 9/2011 | Bottome | |
| 2012/0134843 A1* | 5/2012 | Bottome | F01D 5/066 416/245 R |

* cited by examiner

GAS TURBINE ENGINE WITH ATTACHED NOSECONE

CROSS-REFERENCE TO RELATED APPLICATION(S)

This application is a non-provisional application of U.S. application Ser. No. 61/746,784, filed Dec. 28, 2012. All references are incorporated herein.

BACKGROUND

The present disclosure relates generally to gas turbine engines and, more particularly, to nosecones for gas turbine engines.

A gas turbine engine is a type of power plant commonly used for generating thrust for aircrafts, power for land or sea based operations, or other applications. A typical gas turbine engine includes an inlet section for drawing in a large mass of air, a compressor section for receiving and compressing the large mass of air to provide high-pressure air, a combustion section for mixing and combusting air and fuel, and a turbine section for receiving combustion gases and causing turbine blades to rotate to generate the aforementioned thrust or power.

The inlet section of the gas turbine engine may employ a nosecone assembly attached to a support structure, such as a support structure attached to a rotor. The nosecone assembly is generally constructed of multiple pieces of a very specific shape which are manufactured and assembled to tight tolerances to provide aerodynamic flow of air into the gas turbine engine. The nosecone assembly often includes a nosecone and a separate end cap attached to the nosecone. A support structure is provided to allow the cap to be bolted thereto. Due to the nosecone being constructed of a thin metal sheet, it is difficult to attach the nosecone to the support structure and the cap to the nosecone without warping or breaking the nosecone. Furthermore, conventional support structures can disrupt the aerodynamic flow of air around the nosecone. Such support structures can be relatively bulky, heavy, and expensive.

SUMMARY

According to the present invention, a gas turbine engine includes a compressor section and a nosecone assembly. The compressor section includes an inlet guide vane assembly including an inner shroud, an outer shroud, and an inlet guide vane extending from the inner shroud to the outer shroud. The nosecone assembly is attached to the inner shroud.

Another embodiment is a method of attaching a nosecone assembly to a gas turbine engine. The method includes positioning the nosecone assembly adjacent an inner shroud of an inlet guide vane assembly and connecting the nosecone assembly to the inner shroud via a first plurality of fasteners.

DETAILED DESCRIPTION

Figure 1:
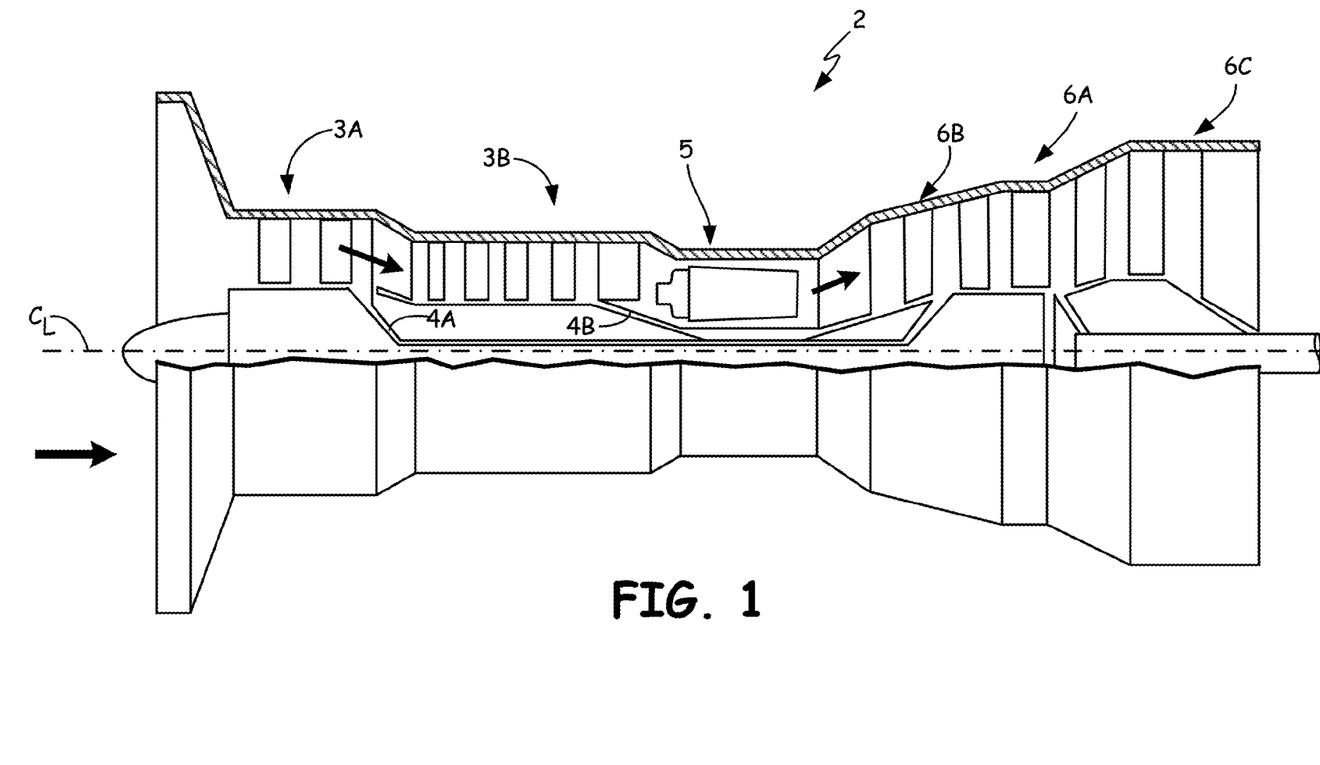
FIG. 1 is a sectional view of a gas turbine engine.

Referring now to the drawings, and with specific reference to FIG. 1, a gas turbine engine is generally referred to by reference numeral 2. As depicted and described herein, gas turbine engine 2 may be an industrial gas turbine engine such as those used in land-based power generation or the like. As shown herein, gas turbine engine 2 may generally include compressor section 3A mounted to central shaft 4A. Downstream of compressor section 3A is an annular combustion chamber 5. Downstream of combustion chamber 5 is turbine section 6A also mounted to central shaft 4A.

In the illustrated embodiment, gas turbine engine 2 also includes compressor section 3B and turbine section 6B connected by shaft 4B. Compressor section 3A can be a low pressure compressor section, compressor section 3B can be a high pressure compressor section, turbine section 6B can be a high pressure turbine section, and turbine section 6A can be a low pressure turbine section. Shafts 4A and 4B are concentric and can rotate about centerline axis $C_L$. Turbine section 6C is a power turbine section rotating independently from and positioned downstream of turbine sections 6A and 6B. Turbine section 6C may, for example, drive an electrical generator, pump, or gearbox (not shown).

Accordingly, it can be seen that, generally speaking, gas turbine engine 2 works by having compressor sections 3A and 3B draw in ambient air and compressing the same. That compressed air is then delivered to combustion chamber 5 where it is ignited, with the resulting hot combustion gases then being delivered to turbine sections 6A, 6B, and 6C. The hot expanding combustion gases cause the blades of turbine section 6A to rotate, and as they are mounted on the same shaft 4A as the blades of compressor section 3A, compressor section 3A rotates as well to create a self-sustaining cycle. Similarly, the hot expanding combustion gases cause the blades of turbine section 6B to rotate, and as they are mounted on the same shaft 4B as the blades of compressor section 3B, compressor section 3B rotates as well to create a self-sustaining cycle. The hot expanding combustion gases then flow downstream to cause the blades of turbine section 6C to rotate, driving the connected electrical generator, pump, gearbox, or other load.

Figure 2:
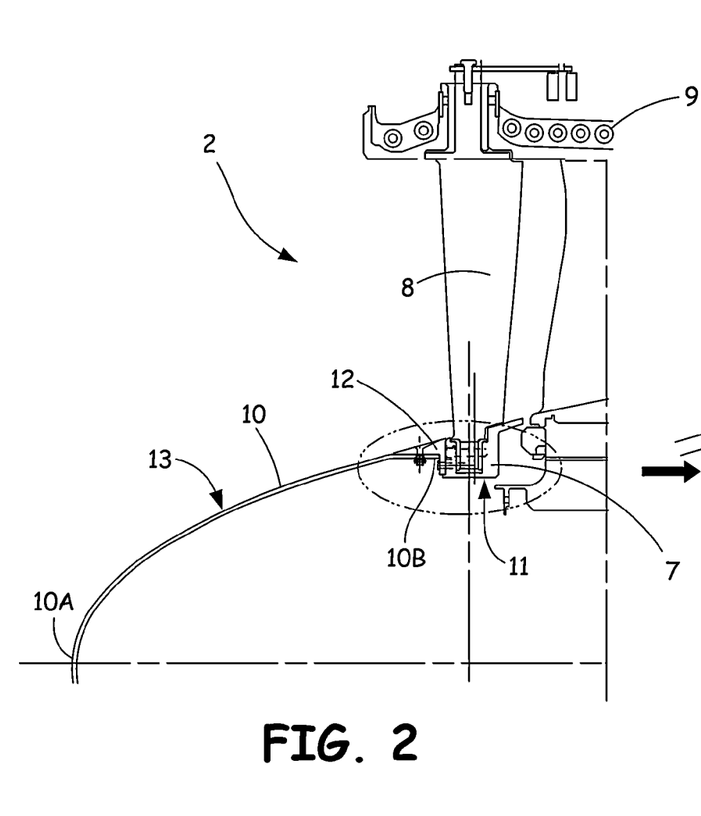
FIG. 2 is a partial sectional view showing a nosecone attached to an inlet guide vane (IGV) inner shroud of a gas turbine engine via a support ring, in accordance with at least some embodiments of the present disclosure.
Figure 3:
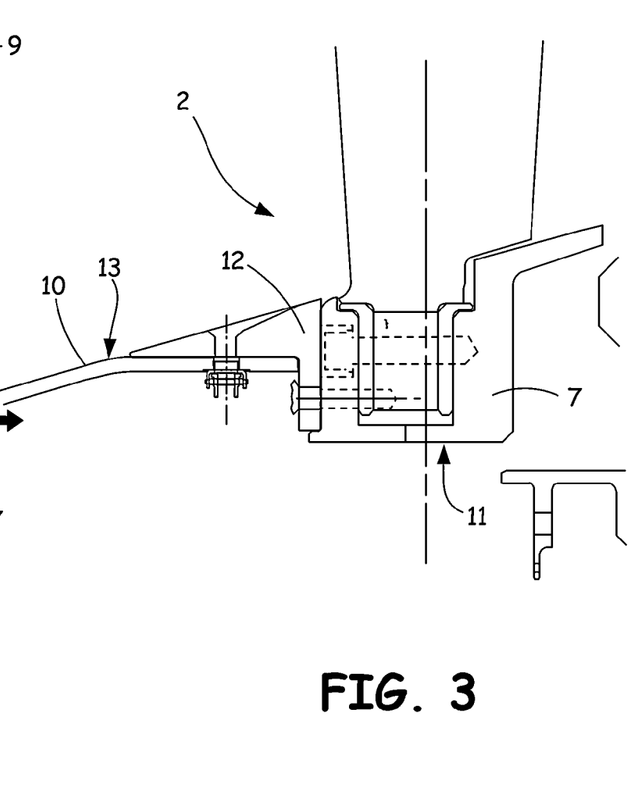
FIG. 3 shows a portion of FIG. 2 in an enlarged form.

Referring to FIGS. 2 and 3, a partial sectional view of gas turbine engine 2 is shown, in accordance with at least some embodiments of the present disclosure. As shown, gas turbine engine 2 may include inlet guide vane (IGV) inner shroud 7 and IGV vane 8. IGV vane 8 may be connected on one (radially inner) end to IGV inner shroud 7 and surrounded by compressor case 9 on the other (radially outer) end. IGV inner shroud 7, IGV vane 8, and compressor case 9 combine to form IGV assembly 11. IGV assembly 11 can be part of compressor 3A (shown in FIG. 1). Compressor case 9 can include or act as an outer shroud for IGV vane 8. IGV inner shroud 7 and compressor case 9 are static support structures in gas turbine engine 2. IGV vane 8 is a variable stator vane, pivotably connected to and extending between IGV inner shroud 7 and compressor case 9.

Gas turbine engine 2 may also include nosecone 10 connected to IGV inner shroud 7 via support ring 12, the details of which are shown more clearly in FIG. 3 and described further below in FIGS. 4-6. Nosecone 10 combines with support ring 12 to form nosecone assembly 13. Nosecone 10 has a substantially conical shape with a curved profile from a closed nosecone tip 10A, extending rearward toward to an open nosecone aft end 10B. Nosecone 10 may be formed of aluminum or any other suitable material commonly employed in the design of gas turbine engines. Additionally, nosecone 10 may be formed as unitary piece extending along the curved profile from nosecone tip 10A to nosecone aft end 10B. It will be understood that only those components that are required for a proper understanding of the present disclosure have been shown and described herein. Nevertheless, several other components that are present in a typical gas turbine engine or used in conjunction or combination therewith are contemplated and considered within the scope of the present disclosure.

Figure 4:
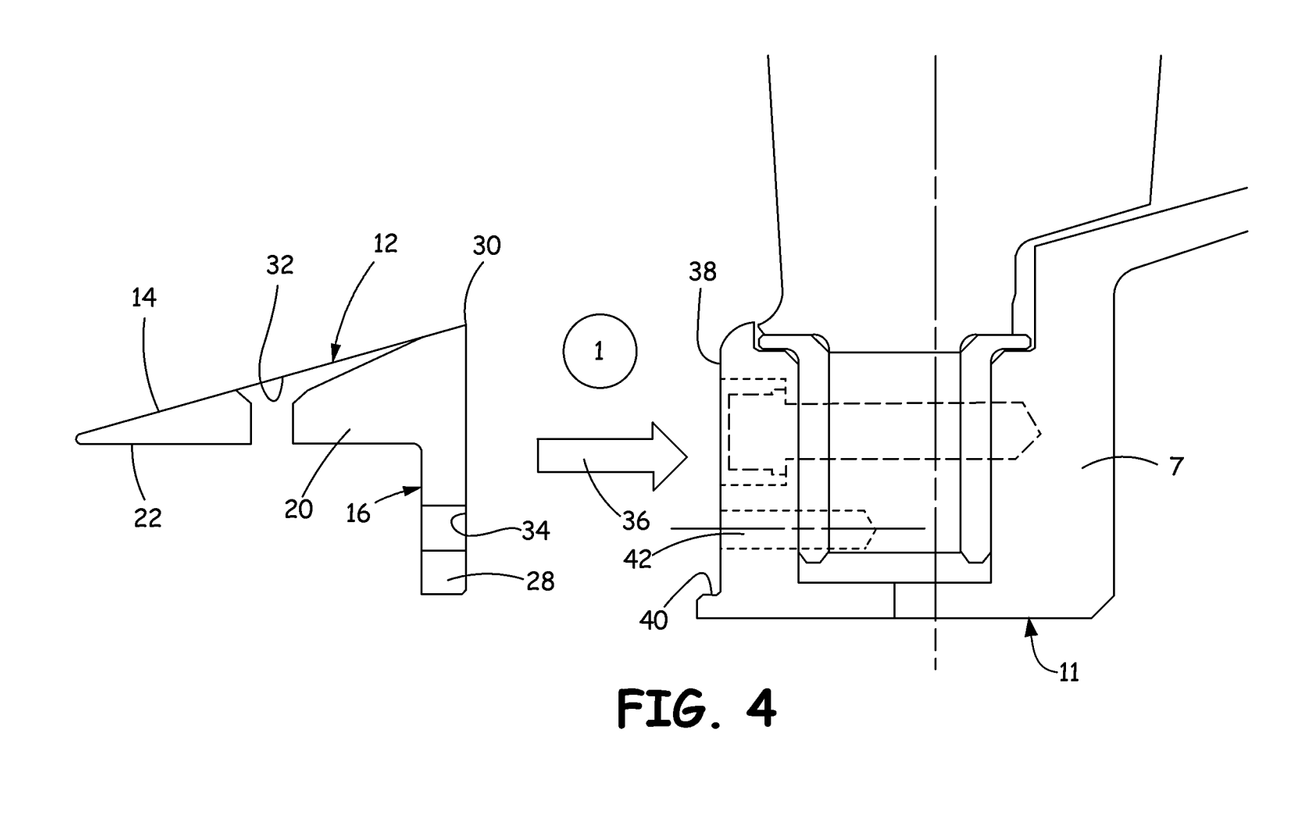
FIGS. 4-6 show various steps of attaching the support ring of FIG. 2 to the nosecone and the IGV inner shroud.
Figure 5:
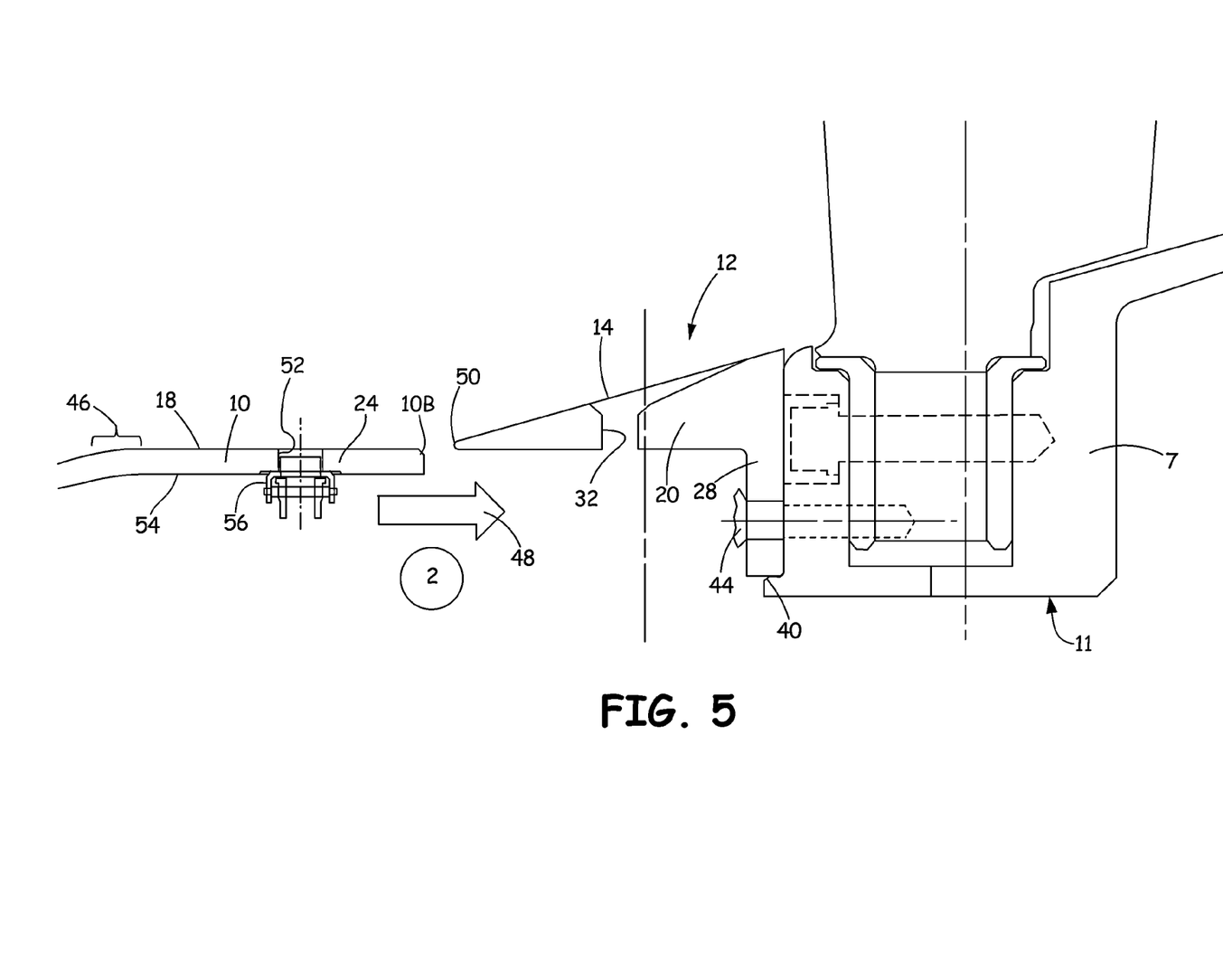
Figure 6:
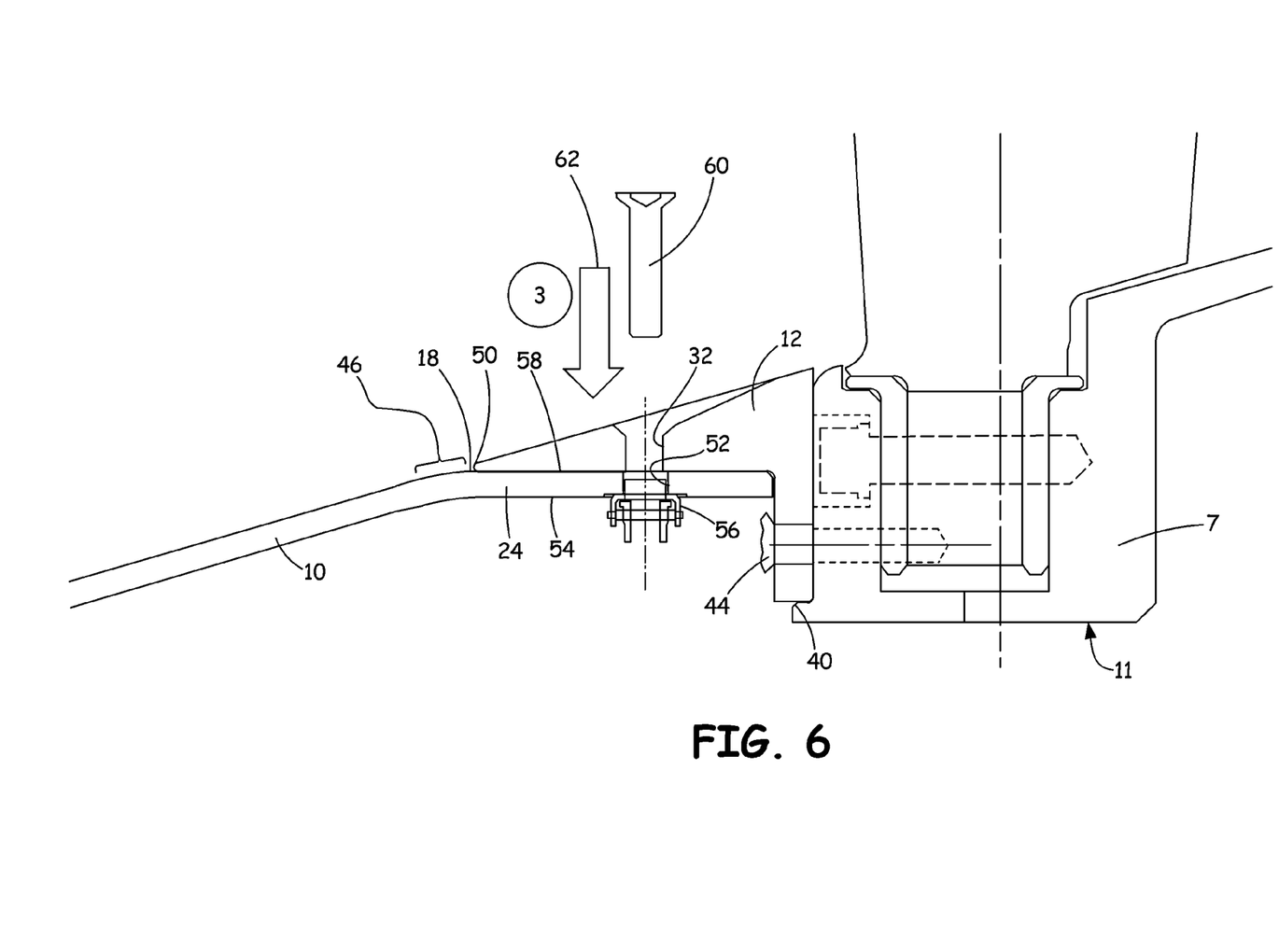
Figure 7:
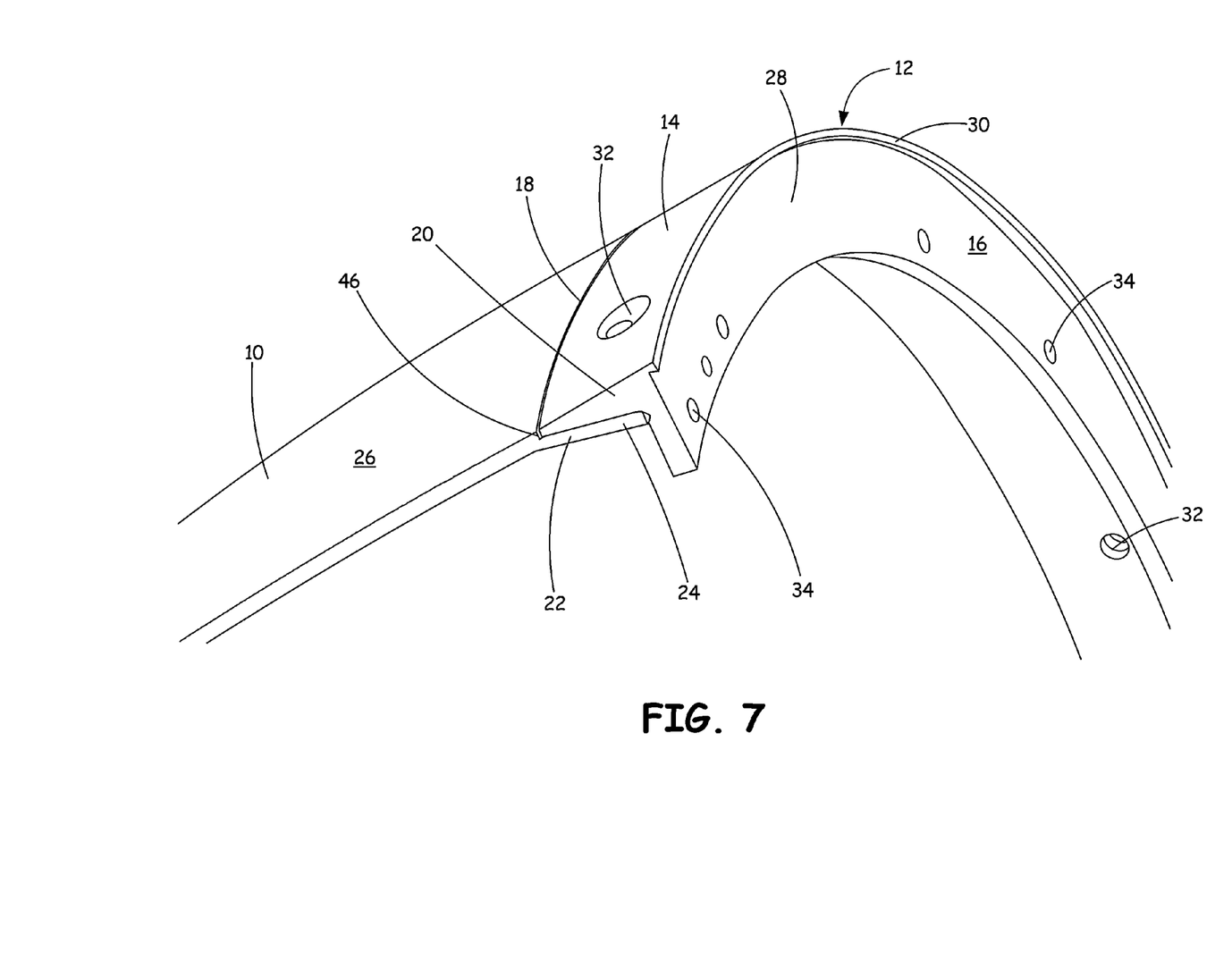
FIG. 7 shows a perspective view of a portion of the nosecone and the support ring connected to the nosecone, in accordance with one embodiment of the present disclosure.

Turning now to FIGS. 4-6 and referring to those in conjunction with FIGS. 3 and 7, the steps of attachment of nosecone 10 to IGV inner shroud 7 via support ring 12 are shown, in accordance with at least some embodiments of the present disclosure. With respect to support ring 12 in particular, in at least some embodiments and as shown, it may be cylindrical or substantially cylindrical in shape having rim 14 and flange 16 extending inboard from rim 14. As visible more clearly in FIGS. 3 and 7, rim 14 may have a somewhat curved and sloping profile following the curved profile from point 18 of nosecone 10. Support ring 12 may also include first portion 20 having a substantially triangular profile to support rim 14, as well as to facilitate the continuous sloping profile of nosecone 10 and rim 14. First portion 20 may include cylindrical wall 22 which may rest on platform 24 at nosecone aft end 10B of nosecone 10. Specifically, first portion 20 may be designed such that upon assembly, support ring 12 is flush with top surface 18 of nosecone 10. Furthermore, flange 16 may be designed such that wall 22 has a length substantially the same as that of platform 24.

As will be described below, rim 14 and first portion 20 of flange 16 may be employed for connecting to nosecone 10 and second portion 28 of flange 16 may be employed for connecting to IGV inner shroud 7. Furthermore, second portion 28 of flange 16 may extend in an inboard direction from edge 30 of first portion 20, as shown in FIG. 4 or alternatively, as shown in FIG. 7, flange 16 may extend in an inboard direction slightly away from edge 30. Similar to nosecone 10, support ring 12 may be formed of aluminum or any other suitable material commonly employed in the design of gas turbine engines. Additionally, rim 14 and flange 16 may be formed as a unitary piece or separate pieces connected together in operational association.

To facilitate the connection of nosecone 10 and support ring 12, rim 14 and first portion 20 of flange 16 may be formed with holes 32 at short intervals throughout the circumference of support ring 12, with each hole extending radially from rim 14 through wall 22 of the first portion for receiving a screw or bolt that connects rim 14 to nosecone 10, in a manner described below. (The terms screw and bolt will be used interchangeably herein, with either term being used to refer to both screws and bolts.) Similarly, second portion 28 of flange 16 may also be formed with holes 34 throughout its circumference at short intervals, with each hole facilitating connection of support ring 12 to IGV inner shroud 7, as also described below.

Support ring 12 may be positioned between and connected to nosecone 10, as well as IGV inner shroud 7. As shown in FIG. 4, support ring 12 may be first connected to IGV shroud 7. Specifically, second portion 28 of flange 16 of support ring 12 may be slid in a direction shown by arrow 36 until it is adjacent to and hits wall 38 of IGV inner shroud 7 and rests against rim 40 thereof. Wall 38 of IGV inner shroud 7 may have holes 42 at short intervals throughout the circumference of wall 38 and each hole may align with one of holes 34 of second portion 28 when flange 16 is abutted against wall 38. Second portion 28 of flange 16 may be designed such that it has a height similar to that of wall 38 above rim 40. Bolt 44 may be inserted substantially axially through each of holes 34 of flange 16 and into the aligning hole 42 of wall 38 of IGV inner shroud 7 to secure support ring 12 to IGV inner shroud 7, as shown in FIG. 5. It will be understood that only one of holes 34 and one of holes 42 receiving bolt 44 is shown in FIGS. 4-6. Nevertheless, holes 34 and 42 are formed through the entire circumference of both IGV inner shroud 7 and flange 16, as described above, with each of the corresponding holes receiving one of bolts 44 or other fastening mechanism.

After connecting support ring 12 to IGV inner shroud 7, nosecone 10 may be secured to support ring 12. In order to facilitate the connection of nosecone 10 and support ring 12, nosecone platform 24 may be formed with small step 46 (see FIG. 7) at point 18 thereof. As shown in FIG. 5, nosecone 10 may be slid towards support ring 12 in a direction indicated by arrow 48 until step 46 hits tip 50 of rim 14 or wall 22 of flange 16 rests snugly on platform 24 of nosecone 10. Platform 24 may be designed with holes 52 that may align with holes 32 on rim 14 and first portion 20 after support ring 12 is abutted against step 46 of nosecone 10. Inner wall 54 of platform 24 may also have nut plate 56 riveted or attached in another manner thereto to facilitate connection of nosecone 10 to support ring 12.

Specifically, as shown in FIG. 6, nosecone 10 may be clamped in between nut plate 56 on inner wall 54 of platform 24 and support ring 12 on an outer wall 58 of platform 24. Screws 60 or other fastener may be inserted in a direction shown by arrow 62 into each of aligning holes 32 and 52 and secured to nut plate 56. Each of screws 60 may be a flush head screw and countersunk into support ring 12 such that the head of the screw remains flush with the top surface of rim 14 upon installation. Furthermore, to provide anti-rotation capability to screw 60, such that screw 60 does not disengage and get sucked in into IGV inner shroud 7, the head of screw 60 may be peened. Specifically, the edges of screw 60 head may be locally deformed into holes 32 of rim 14 to prevent rotation of screw 60 within holes 32 and 52. Screw 60 may also be formed with at least one locking thread to further prevent rotation of screw 60 within holes 32 and 52 and disengagement from rim 14. Nosecone 10 is connected to IGV inner shroud 7 via support ring 12 as shown in FIG. 3.

By virtue of utilizing a flush head screw 60 to connect nosecone 10 to support ring 12, a flush surface at the intersection of nosecone 10 and support ring 12 may be achieved and the disruption to the flow of inlet air around nosecone 10 may be minimized, thereby substantially preserving the aerodynamic flow of air into IGV inner shroud 7. Notwithstanding the fact that in the present embodiment, a flush head screw (e.g., screw 60) with anti-rotation capabilities has been employed for connecting nosecone 10 to support ring 12, in at least some embodiments, other types of screw or fastening mechanisms that may provide a flush surface with rim 14 and have anti-rotational capabilities may be employed as well. Furthermore, flexibility for thermal growth between the stiffer support ring 12 and nosecone 10 can be provided by scallops or tabs 62 as shown in FIG. 8.

Figure 8:
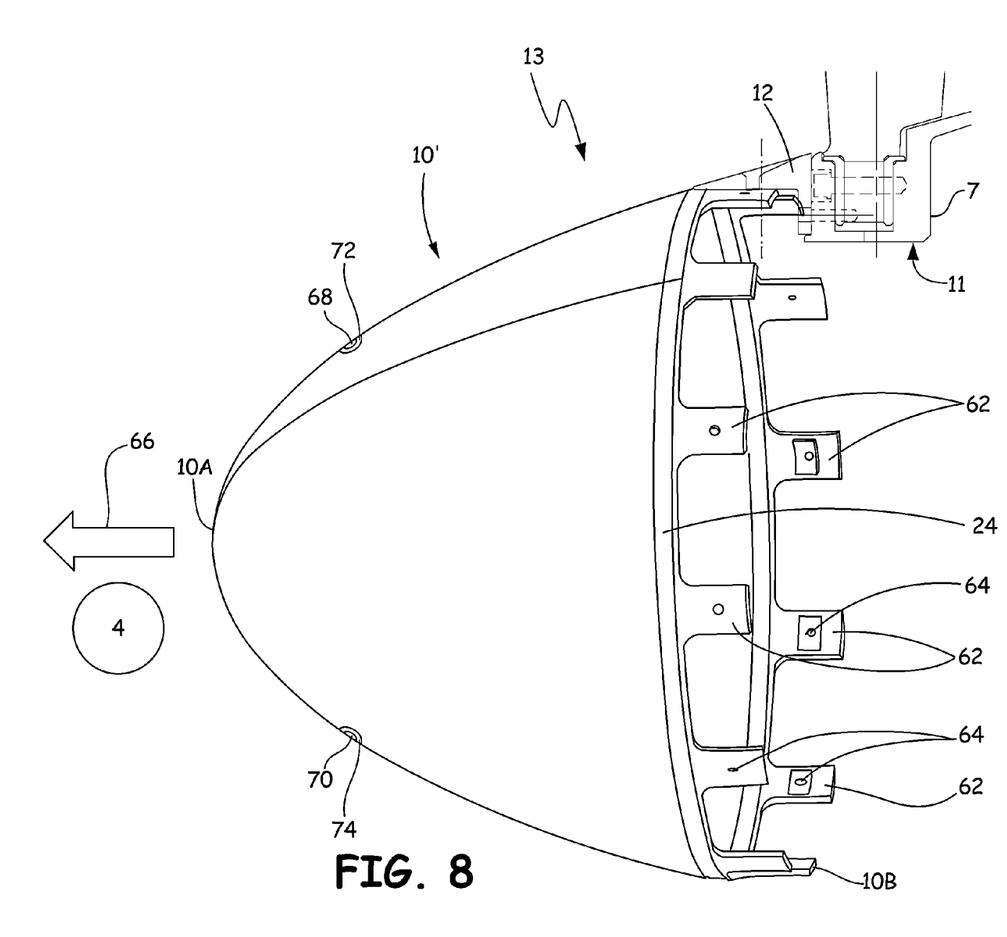
FIG. 8 shows a perspective view of a second embodiment of the nosecone and a sectional view of the support ring connected to the nosecone.

Referring now to FIG. 8, a second embodiment of nosecone 10' is shown, in accordance with at least some embodiments of the present disclosure. To the extent that nosecone 10' of FIG. 8 is substantially similar to nosecone 10 of FIG. 7 (which shows one embodiment of the nosecone), only the differences between the two embodiments will be described herein. Specifically, platform 24 of nosecone 10' may be designed with nosecone tabs 62 extending axially aft from the platform. Each of nosecone tabs 62 may be provided with hole 64 that aligns with holes 32 on first portion 20 of flange 16 of support ring 12 when support ring 12 is slid against platform 24 of nosecone 10'. The assembly of nosecone 10' is similar to that of nosecone 10 described above with screw 60 being inserted radially inward into holes 32 and 64. Nosecone tabs 62 provide easy removal of nosecone 10' from support ring 12 and IGV inner shroud 7. Specifically, to remove nosecone 10', it may be slid away from support ring 12 (after removing screws 60) in a direction indicated by arrow 66.

In the embodiment shown in FIG. 8, nosecone 10' includes holes 68 and 70. Holes 68 and 70 are tool holes that extend through nosecone 10'. In the illustrated embodiment, holes 68 and 70 extend substantially radially inward through nosecone 10'. Holes 68 and 70 can be structurally reinforced such that nosecone 10' is stronger adjacent holes 68 and 70 than at least some other portions of nosecone 10'. Structurally reinforcing nosecone 10' allows nosecone 10' to be removed from support ring 12 via a pulling force applied to holes 68 and 70.

In the embodiment illustrated in FIG. 8, holes 68 and 70 are structurally reinforced via grommets 72 and 74 attached to nosecone 10' at holes 68 and 70, respectively. In alternative embodiments, holes 68 and 70 can be structurally reinforced via a hard anodized coating applied to nosecone 10' at holes 68 and 70. In further alternative embodiments, holes 68 and 70 can be structurally reinforced via other structure suitable for the application. By structurally reinforcing holes 68 and 70, holes 68 and 70 can be strengthened to allow nosecone 10' to be removed from support ring 12 without damaging nosecone 10'.

Holes 68 and 70 are positioned nearer nosecone tip 10A than nosecone aft end 10B. In the illustrated embodiment, holes 68 and 70 are positioned about one-third of the way from nosecone tip 10A to nosecone aft end 10B. By positioning holes 68 and 70 away from nosecone aft end 10B, holes 68 and 70 can be spaced from IGV assembly 11 to reduce the effect of holes 68 and 70 on air flowing through IGV assembly 11. Hole 68 is positioned substantially circumferentially opposite hole 70. In alternative embodiments, holes 68 and 70 can be positioned elsewhere on nosecone 10' suitable for the application. In further alternative embodiments, nosecone 10' can include fewer or more than two holes 68 and 70. For example, in one alternative embodiment, a single hole (not shown) could be positioned at nosecone tip 10A. Although holes 68 and 70 are shown on nosecone 10', holes 68 and 70 can also be included on nosecone 10 (shown in FIGS. 2, 3, 5, 6, and 7) or another nosecone suitable for the application.

Figure 9:
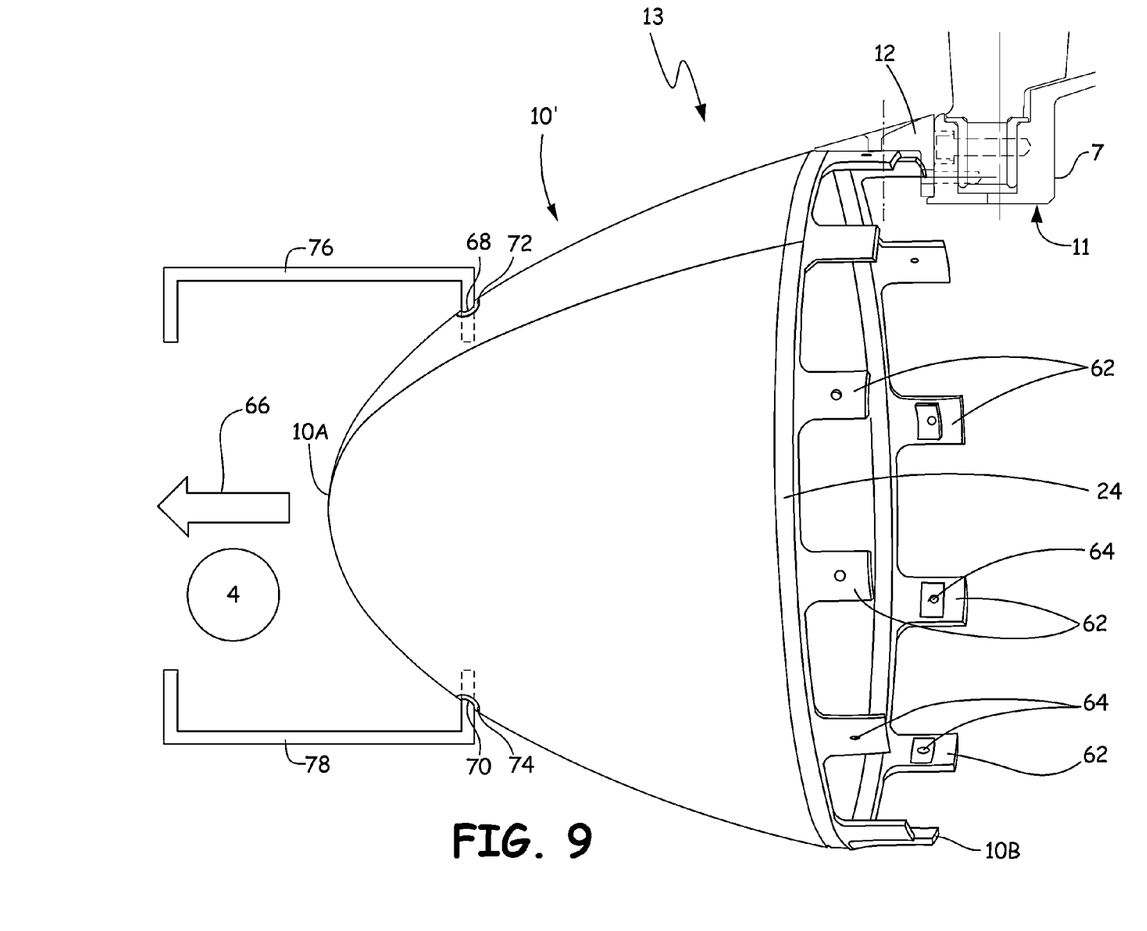
FIG. 9 shows a perspective view of the second embodiment of the nosecone with removal tools inserted through tool holes.

FIG. 9 is a perspective view of nosecone 10' and removal tools 76 and 78. Removal tools 76 and 78 can be used to remove nosecone 10' from support ring 12. First, removal tools 76 and 78 are inserted in holes 68 and 70, respectively. Removal tools 76 and 78 can be inserted into holes 68 and 70 in a substantially radial direction. Second, a pulling force is applied to nosecone 10' via removal tools 76 and 78 so as to pull nosecone 10' away from support ring 12. In this manner, nosecone 10' can be removed from support ring 12 without having to heat and expand support ring 12. Thus, nosecone 10' and support ring 12 can be at a substantially same temperature while nosecone 10' is pulled away from support ring 12. In one embodiment, nosecone 10' and support ring 12 can be at a substantially ambient temperature while nosecone 10' is pulled away from support ring 12.

Even though support ring 12 is positioned radially outward of and in friction contact with nosecone 10', removal tools 76 and 78 can pull nosecone 10' away from support ring 12 without heating support ring 12 and without damaging nosecone 10'. In one embodiment, removal tools 76 and 78 can be rigid tools configured specifically for use with nosecone 10'. In other embodiments, removal tools 76 and 78 can be other tools suitable for the application.

In the illustrated embodiment, two removal tools 76 and 78 are inserted into two holes 68 and 70. In alternative embodiments, fewer or more than two removal tools 76 and 78 can be inserted into fewer or more than two holes 68 and 70. For example, in one alternative embodiment, removal tool 76 can be lengthened and can be inserted first into hole 68 and then into hole 70 so as to apply a pulling force to both holes 68 and 70. In another alternative embodiment, hole 68 can be positioned at nosecone tip 10A, hole 70 can be omitted, and removal tool 76 can be inserted into hole 68 for applying a pulling force to nosecone 10' at nosecone tip 10A. In further alternative embodiments, three or more removal tools 76 and 78 can be inserted into three or more holes 68 and 70.

Figure 10:
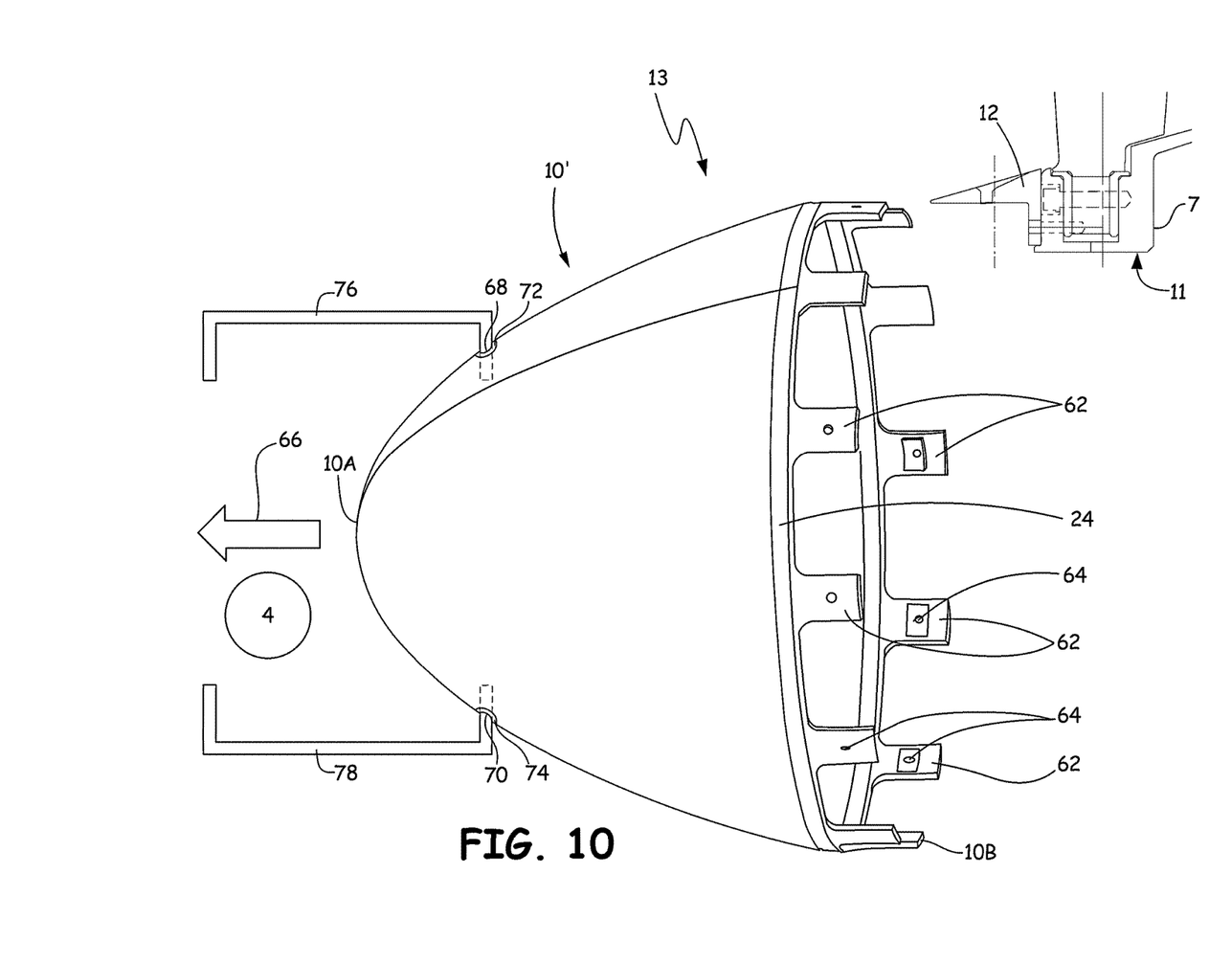
FIG. 10 shows a perspective view of the second embodiment of the nosecone after it has been removed from the support ring.

FIG. 10 is a perspective view of nosecone 10' after it has been removed from support ring 12. Removal of nosecone 10' can allow access to various components of gas turbine engine 2 (shown in FIG. 1) such as shaft 4A (shown in FIG. 1), IGV assembly 11, and nosecone assembly 13. Maintenance personnel can then perform maintenance on and/or repair such components as necessary. After maintenance has been completed, nosecone assembly 13 can be re-attached in the manner described above with respect to FIGS. 2-6.

It will be understood that while the connection between nosecone 10 (or 10') and support ring 12 has been described as following a certain order of steps (e.g., first connecting the support ring to the IGV inner shroud and then connecting the nosecone to the support ring), this order is merely exemplary.

The foregoing disclosure stands in contrast to prior art designs employing multiple pieces to form the nosecone and in so doing making assembly and disassembly more difficult, time-consuming and prone to damage. In addition, the single piece construction of the nosecone of the present disclosure eliminates welding and allows the nosecone to be formed from sheet stock material by spinning or pressing process, resulting in lower cost components. The nosecone assembly of the present disclosure can have relatively few gaps and recesses improving aerodynamic flow. Further, the nosecone assembly can be attached to an inner shroud of an inlet guide vane without an intervening structural support. Omitting a separate structural support can reduce cost, reduce weight, and improve aerodynamics of an industrial gas turbine engine. The nosecone assembly of the present disclosure can also facilitate relatively easy and efficient assembly and disassembly while reducing risk of damage.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

Discussion of Possible Embodiments

The following are non-exclusive descriptions of possible embodiments of the present invention.

A gas turbine engine can include a compressor section and a nosecone assembly. The compressor section can include an inlet guide vane assembly including an inner shroud, an outer shroud, and an inlet guide vane extending from the inner shroud to the outer shroud. The nosecone assembly can be attached to the inner shroud.

The gas turbine engine of the preceding paragraph can optionally include, additionally and/or alternatively any, one or more of the following features, configurations and/or additional components:

the nosecone assembly can include a nosecone and a nosecone support ring connected to an aft end of the nosecone;

the nosecone can be bolted to the nosecone support ring which can be bolted to the inner shroud;

the nosecone can include a plurality of tabs extending axially aft of the aft end of the nosecone and a plurality of bolts can extend radially inward through the nosecone support ring and into the plurality of tabs;

the plurality of bolts can be countersunk into the nosecone support ring such that heads of the plurality of bolts are positioned flush with or below an outer surface of the nosecone support ring;

a first set of bolts can extend substantially radially to connect the nosecone to the nosecone support ring and a second set of bolts can extend substantially axially to connect the nosecone support ring to the inner shroud;

the nosecone support ring can include a rim and a flange ending radially inward of the rim;

the flange can be bolted to the inner shroud;

the nosecone can be bolted to the rim;

the nosecone assembly can be bolted directly to the inner shroud;

the gas turbine engine can be an industrial gas turbine engine having a power turbine section downstream of the compressor section; and/or the inlet guide vane can be a variable stator vane pivotably connected between the inner shroud and the outer shroud.

A method of attaching a nosecone assembly to a gas turbine engine can include positioning the nosecone assembly adjacent an inner shroud of an inlet guide vane assembly and connecting the nosecone assembly to the inner shroud via a first plurality of fasteners.

The method of the preceding paragraph can optionally include, additionally and/or alternatively any, one or more of the following features, configurations and/or additional steps:

connecting the nosecone assembly to the inner shroud via a first plurality of fasteners can include inserting the first plurality of fasteners through a first plurality of holes in a flange of the nosecone assembly and into a second plurality of holes in the inner shroud;

the nosecone assembly can include a nosecone and a support ring, and the nosecone can be connected to the support ring via a second plurality of fasteners;

the first plurality of fasteners can be a first plurality of bolts, and the second plurality of fasteners can be a second plurality of bolts;

the first plurality of bolts can be aligned substantially axially with respect to an engine centerline axis and the second plurality of bolts can be aligned substantially radially with respect to an engine centerline axis;

the support ring can be connected to the shroud before connecting the nosecone to the support ring;

the inlet guide vane assembly can include a variable stator vane pivotably connected to the inner shroud; and/or connecting the nosecone assembly to the inner shroud via a first plurality of fasteners can include bolting the nosecone assembly directly to the inner shroud.

The invention claimed is:

1. A gas turbine engine comprising:
a compressor section comprising:
an inlet guide vane assembly comprising:
an inner shroud;
an outer shroud; and
an inlet guide vane extending from the inner shroud to the outer shroud; and
a nosecone assembly attached to the inner shroud, wherein the nosecone assembly comprises:
a nosecone; and
a nosecone support ring connected to an aft end of the nosecone, wherein a first set of bolts extend substantially radially to connect the nosecone to the nosecone support ring, and wherein a second set of bolts extend substantially axially to connect the nosecone support ring to the inner shroud.

2. The gas turbine engine of claim 1, wherein the nosecone comprises a plurality of tabs extending axially aft of the aft end of the nosecone and wherein the first set of bolts extend radially inward through the nosecone support ring and into the plurality of tabs.

3. The gas turbine engine of claim 1, wherein the first set of bolts are countersunk into the nosecone support ring such that heads of the first set of bolts are positioned flush with or below an outer surface of the nosecone support ring.

4. The gas turbine engine of claim 1, wherein the nosecone support ring comprises:
a rim; and
a flange ending radially inward of the rim.

5. The gas turbine engine of claim 4, wherein the flange is bolted to the inner shroud.

6. The gas turbine engine of claim 4, wherein the nosecone is bolted to the rim.

7. The gas turbine engine of claim 1, wherein the nosecone assembly is bolted directly to the inner shroud.

8. The gas turbine engine of claim 1, wherein the gas turbine engine is an industrial gas turbine engine having a power turbine section downstream of the compressor section.

9. The gas turbine engine of claim 1, wherein the inlet guide vane is a variable stator vane pivotably connected between the inner shroud and the outer shroud.

10. A method of attaching a nosecone assembly to a gas turbine engine, the method comprising:
positioning the nosecone assembly adjacent an inner shroud of an inlet guide vane assembly, wherein the nosecone assembly comprises a nosecone and a support ring;

connecting the nosecone assembly to the inner shroud via a first plurality of bolts, wherein the first plurality of bolts are aligned substantially axially with respect to an engine centerline; and connecting the nosecone to the support ring via a second plurality of bolts, wherein the second plurality of bolts are aligned substantially radially with respect to an engine centerline axis.

11. The method of claim 10, wherein connecting the nosecone assembly to the inner shroud via the first plurality of bolts comprises:

inserting the first plurality of bolts through a first plurality of holes in a flange of the nosecone assembly and into a second plurality of holes in the inner shroud.

12. The method of claim 10, and further comprising:

connecting the support ring to the shroud before connecting the nosecone to the support ring.

13. The method of claim 10, wherein the inlet guide vane assembly includes a variable stator vane pivotably connected to the inner shroud.

14. The method of claim 10, wherein connecting the nosecone assembly to the inner shroud via the first plurality of bolts comprises:

bolting the nosecone assembly directly to the inner shroud.

15. A gas turbine engine comprising:
a compressor section comprising:
an inlet guide vane assembly comprising:
an inner shroud;
an outer shroud; and
an inlet guide vane extending from the inner shroud to the outer shroud; and
a nosecone assembly attached to the inner shroud, wherein the nosecone assembly comprises:
a nosecone, wherein the nosecone comprises a plurality of tabs extending axially aft of the aft end of the nosecone; and
a nosecone support ring connected to an aft end of the nosecone and the inner shroud, wherein a plurality of bolts extend radially inward through the nosecone support ring and into the plurality of tabs.

16. The gas turbine engine of claim 15, wherein the nosecone is bolted to the nosecone support ring, which is bolted to the inner shroud.

17. The gas turbine engine of claim 15, wherein the plurality of bolts are countersunk into the nosecone support ring such that heads of the plurality of bolts are positioned flush with or below an outer surface of the nosecone support ring.

18. The gas turbine engine of claim 15, wherein the nosecone support ring comprises:

a rim, wherein the nosecone is bolted to the rim; and
a flange ending radially inward of the rim, wherein the flange is bolted to the inner shroud.

19. The gas turbine engine of claim 15, wherein the nosecone assembly is bolted directly to the inner shroud.

20. The gas turbine engine of claim 15, wherein the inlet guide vane is a variable stator vane pivotably connected between the inner shroud and the outer shroud.

* * * * *